United States Patent
Mukhopadhyay et al.

(10) Patent No.: US 9,941,953 B2
(45) Date of Patent: Apr. 10, 2018

(54) WIRELESS RACK COMMUNICATION SYSTEM

(71) Applicant: Dell Products L.P., Round Rock, TX (US)

(72) Inventors: Snigdhendu S. Mukhopadhyay, San Jose, CA (US); Krishnamurthy Subramanian, Saratoga, CA (US)

(73) Assignee: Dell Products L.P., Round Rock, TX (US)

( * ) Notice: Subject to any disclaimer, the term of this patent is extended or adjusted under 35 U.S.C. 154(b) by 245 days.

(21) Appl. No.: 14/826,924

(22) Filed: Aug. 14, 2015

(65) Prior Publication Data

US 2017/0047988 A1 Feb. 16, 2017

(51) Int. Cl.
*H04B 7/24* (2006.01)

(52) U.S. Cl.
CPC ..................................... *H04B 7/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 2004/0166905 A1* | 8/2004 | Cherniski | ............... | G06F 1/183 455/575.1 |
| 2006/0234787 A1* | 10/2006 | Lee | ...................... | H05K 7/1412 455/575.7 |
| 2012/0311127 A1* | 12/2012 | Kandula | ............... | H04W 16/28 709/224 |
| 2013/0058329 A1* | 3/2013 | Warke | .................... | H04L 12/50 370/359 |
| 2013/0107853 A1* | 5/2013 | Pettus | ................... | H04W 84/10 370/330 |

\* cited by examiner

*Primary Examiner* — Yuwen Pan
*Assistant Examiner* — Zhitong Chen
(74) *Attorney, Agent, or Firm* — Haynes and Boone, LLP

(57) ABSTRACT

A wireless rack communication system includes a rack defining a rack entrance and device housings. A networking device is positioned in a first device housing. The networking device includes a networking device antenna system surface spaced apart from the rack entrance, and networking device antenna systems each extend from the networking device antenna system surface and into the first device housing. Server devices are each positioned in respective second device housings that are located adjacent each other on a same side of the first device housing. Each server device includes a server device antenna system surface that is spaced apart from the rack entrance and a server device antenna system that extends from that server device antenna system surface and into the respective second device housing. An unobstructed wireless communication path is provided between each server device antenna system and a respective one of the networking device antenna systems.

20 Claims, 12 Drawing Sheets

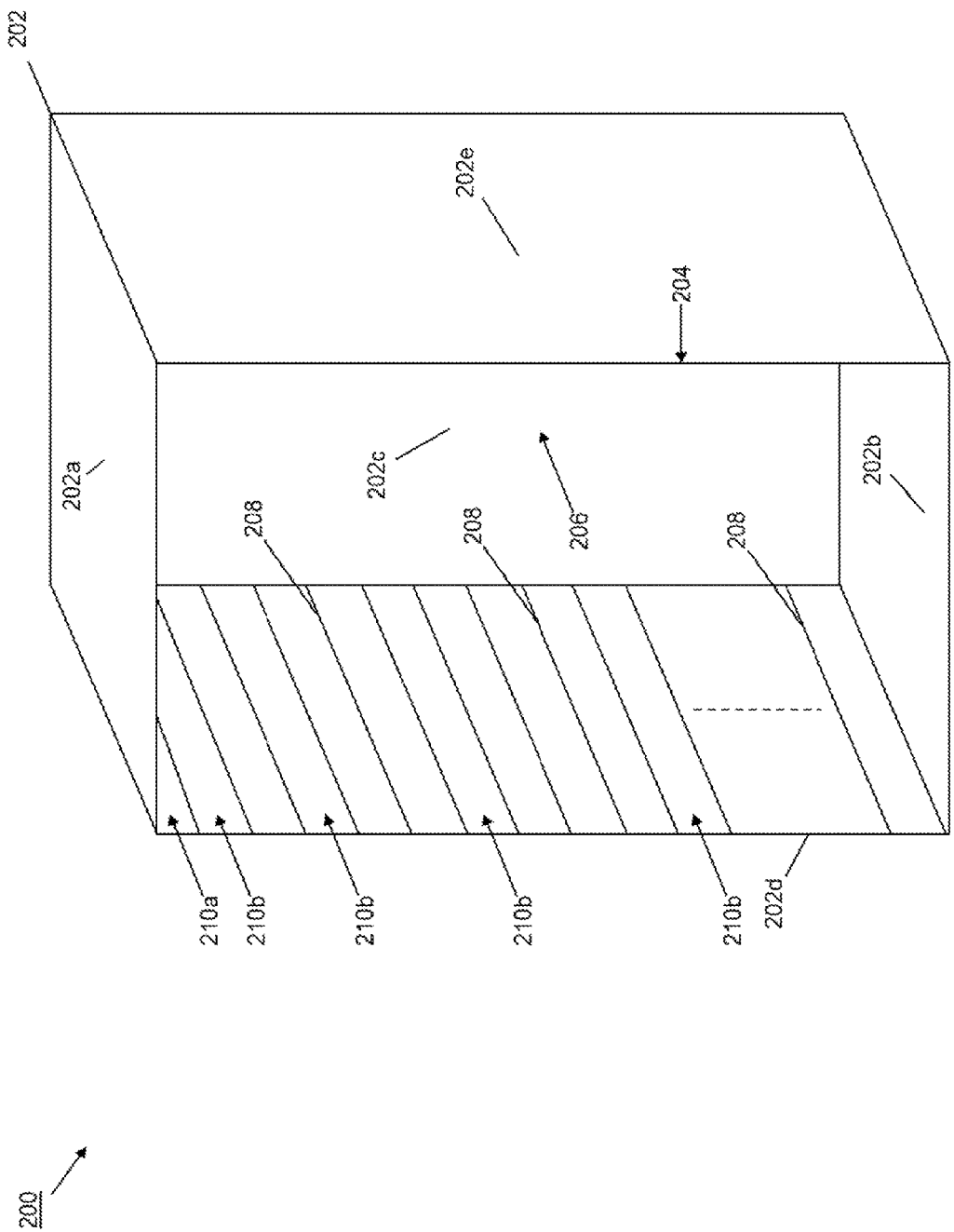

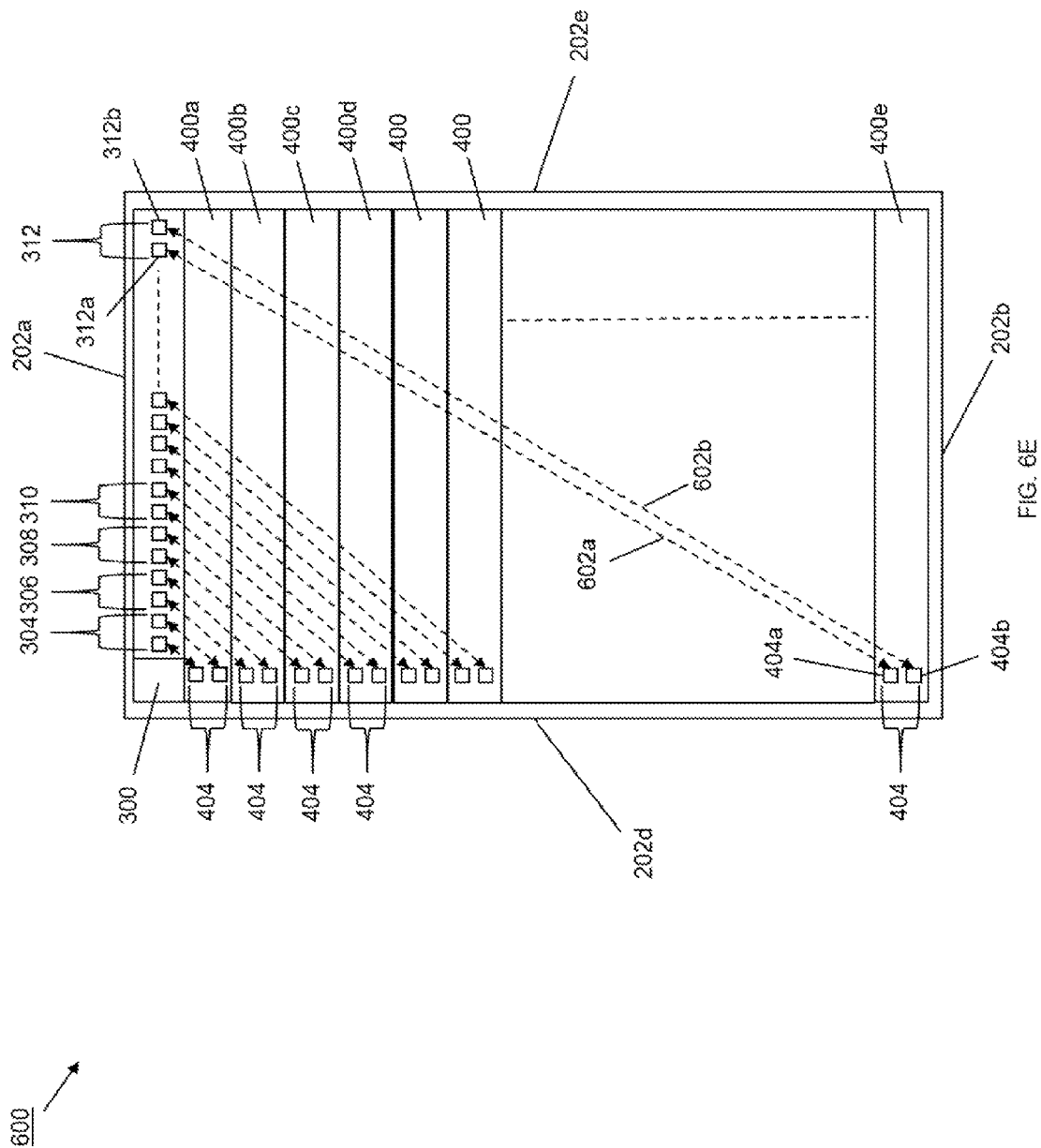

WIRELESS RACK COMMUNICATION SYSTEM

BACKGROUND

The present disclosure relates generally to information handling systems, and more particularly to a wireless communication system for information handling systems in a rack.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, switches, servers, and storage devices, are sometimes positioned in racks and connected together in order to provide a datacenter. For example, a plurality of servers may be connected to a Top Of Rack (TOR) switch that is connected to a network, and the TOR switch may route data from the network and to the servers, from the servers and to the network, as well as between different components in the rack. The servers and TOR switches are typically connected together using conventional cabling such as, for example, Ethernet cables that are configured to transmit the data between the TOR switch and the servers. However, because racks can hold dozens of servers, the connection of between those servers and the TOR switch requires many cables that must be routed through the rack, and that cabling can become cumbersome, obstructing access to the TOR switch, servers, and/or other features of the rack. It is desirable to eliminate the use of conventional cables in connecting devices in a rack, but the use of wireless communication raises a number of issues. For example, because of the close positioning in the servers and the TOR switch in the rack, many types of wireless communications systems will experience interference if used by each of the servers in the rack, while obstructions in the rack between the TOR switch and a server can prevent or degrade more directed types of wireless communications between any particular server and the TOR switch. Some have suggested the use of reflecting systems in the rack that allow directed types of wireless communications between the TOR switch and the server to be reflected around obstructions, but the reflection of wireless communications results in communication losses and/or signal distortion that can degrade the wireless communications to a point that prevents communication between the TOR switch and the servers.

Accordingly, it would be desirable to provide an improved rack communication system.

SUMMARY

According to one embodiment, an information handling system (IHS) includes a chassis that is configured to couple to a rack and that includes an antenna system surface that is spaced apart from a rack entrance defined by the rack when the chassis is coupled to the rack; a wireless communication system that is housed in the chassis; a processing system that is housed in the chassis and coupled to the wireless communication system; and a plurality of first antenna systems that each extend from the antenna system surface and into a device housing between the antenna system surface and the rack entrance when the chassis is coupled to the rack, wherein the wireless communication system is configured to provide wireless communications through each of the plurality of first antenna systems using an unobstructed wireless communication path between that first antenna system and a respective one of a plurality of second antenna systems provided on respective devices that are each positioned in the rack on the same side of the chassis when the chassis is coupled to the rack.

BRIEF DESCRIPTION OF THE DRAWINGS

FIG. 2 is a perspective view illustrating an embodiment of a rack.

FIG. 3B is a schematic view illustrating an embodiment of the networking device of FIG. 3a.

FIG. 6E is a front view illustrating an embodiment of the networking device of FIGS. 3a and 3b and a plurality of the server devices of FIGS. 4a and 4b positioned in the rack of FIG. 2 and communicating with each other using unobstructed wireless communication paths.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
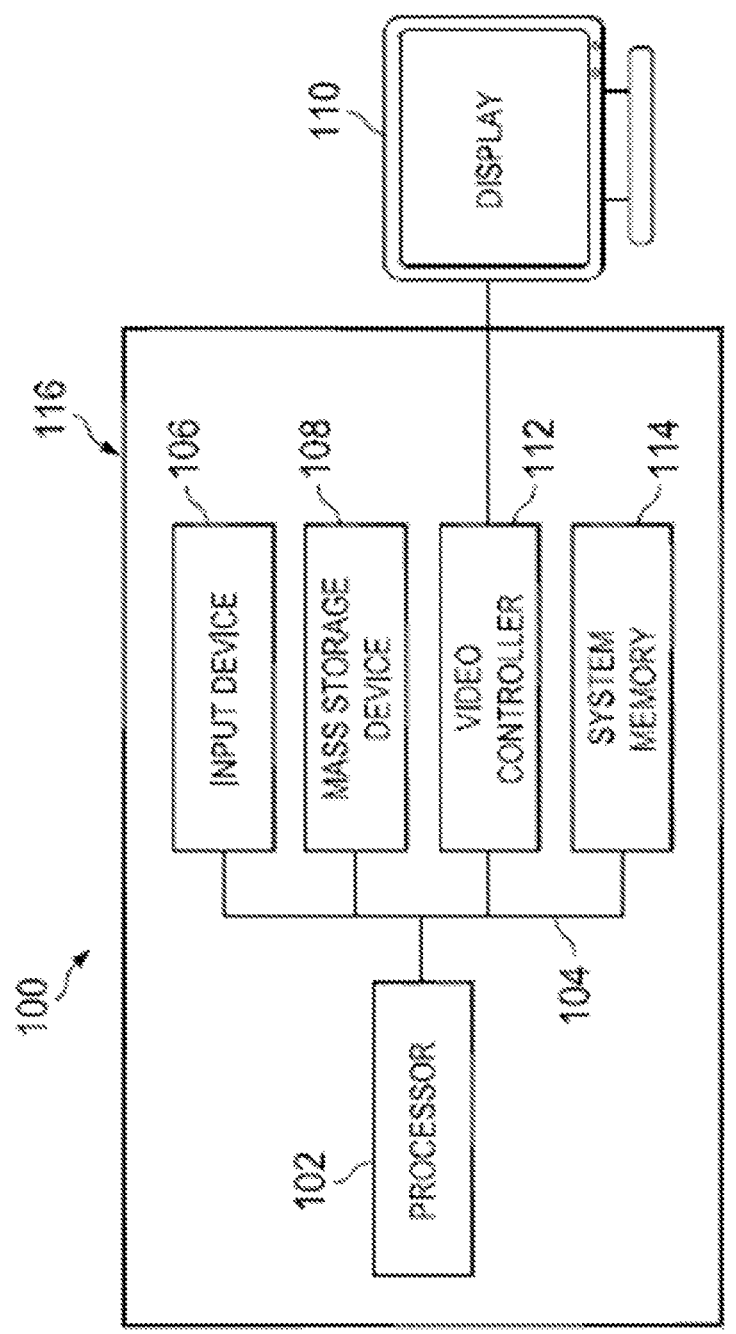
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a rack 200 is illustrated. The rack 200 is illustrated and described below as a conventional datacenter rack that houses a plurality of servers and a TOR switch in a vertical (e.g., one-on-top-of-the-other) orientation. However, one of skill in the art in possession of the present disclosure will recognize that the teachings of the present disclosure may be applied to different types of racks used in different situations (e.g., other than datacenters) and that house other types of devices (e.g., storage devices) in any of a variety of orientations (e.g., a horizontal/side-by-side orientation). The rack 200 includes a rack base 202 having a top wall 202a, a bottom wall 202b that is located opposite the rack base 202 from the top wall 202a, a rear wall 202c that extends between the top wall 202a and the bottom wall 202b, and a pair of side walls 202d and 202e that are located on opposite sides of the rack base 202 and that extend between the top wall 202a, the bottom wall 202b, and the rear wall 202c. While illustrated and described as "walls" for clarity, one of skill in the art in possession of the present disclosure will recognize that any or all of the top wall 202a, the bottom wall 202b, the rear wall 202c, and the side walls 202d and 202e may instead include framing, define channels, holes, or other apertures, and/or may otherwise include different structures that provide the rack 200 while remaining within the scope of the present disclosure. The edges of the top wall 202a, the bottom wall 202b, and the side walls 202d and 202e that are opposite the rear wall 202c define a rack entrance 204 that provides access to a rack housing 206 that is defined between the top wall 202a, the bottom wall 202b, the rear wall 202c, and the side walls 202d and 202e. In the embodiment of FIG. 2, the rack entrance 204 is illustrated as open and allowing access to the rack housing 206. However, in other embodiments, the rack 200 may include a door that is configured to close over the rack entrance 204 and control access to the rack housing 206 (e.g., in a cooled rack). As such, in some embodiments the rack entrance 204 may provide a design limit with regard to devices positioned in the rack housing 206 (e.g., such that they may not extend past the rack housing 204), while in other embodiments, the rack entrance 204 may not introduce such design limits (or at least allow for the extension of devices past the rack housing 204).

As illustrated, the side wall 202d may include a plurality of device coupling features 208 that define a first device housing 210a and a plurality of second device housings 210b. While not illustrated, the side wall 202e may include similar device coupling features that operate to define the first device housing 210a and the second device housings 210b. In the embodiments discussed below, the first device housing 210a is described as being utilized in coupling a networking device to the rack 200, while the second device housings 210b are described as being utilized in coupling server devices to the rack 200. However, one of skill in the art in possession of the present disclosure will recognize that the first device housing 210a and the second device housings 210b may be substantially similar, and may be used to couple any of a variety of different devices to the rack 200. In specific embodiments discussed below, the rack 200 is described as a conventional 19-inch rack that is configured to house devices having widths of approximately 19 inches (e.g., as measured between the side walls 202d and 202e of the rack 200), and that includes a height of 42 rack units (42U) such that the rack 200 may include a networking device in the first device housing 210a and forty server devices in the second device housings 210b. However, the teachings of the present disclosure are not intended to be limited to this specific embodiment, and one of skill in the art will recognize that those teachings may be applied to "half-height" racks, horizontal racks, and/or other racks known in the art while remaining within the scope of the present disclosure.

Figure 3A:
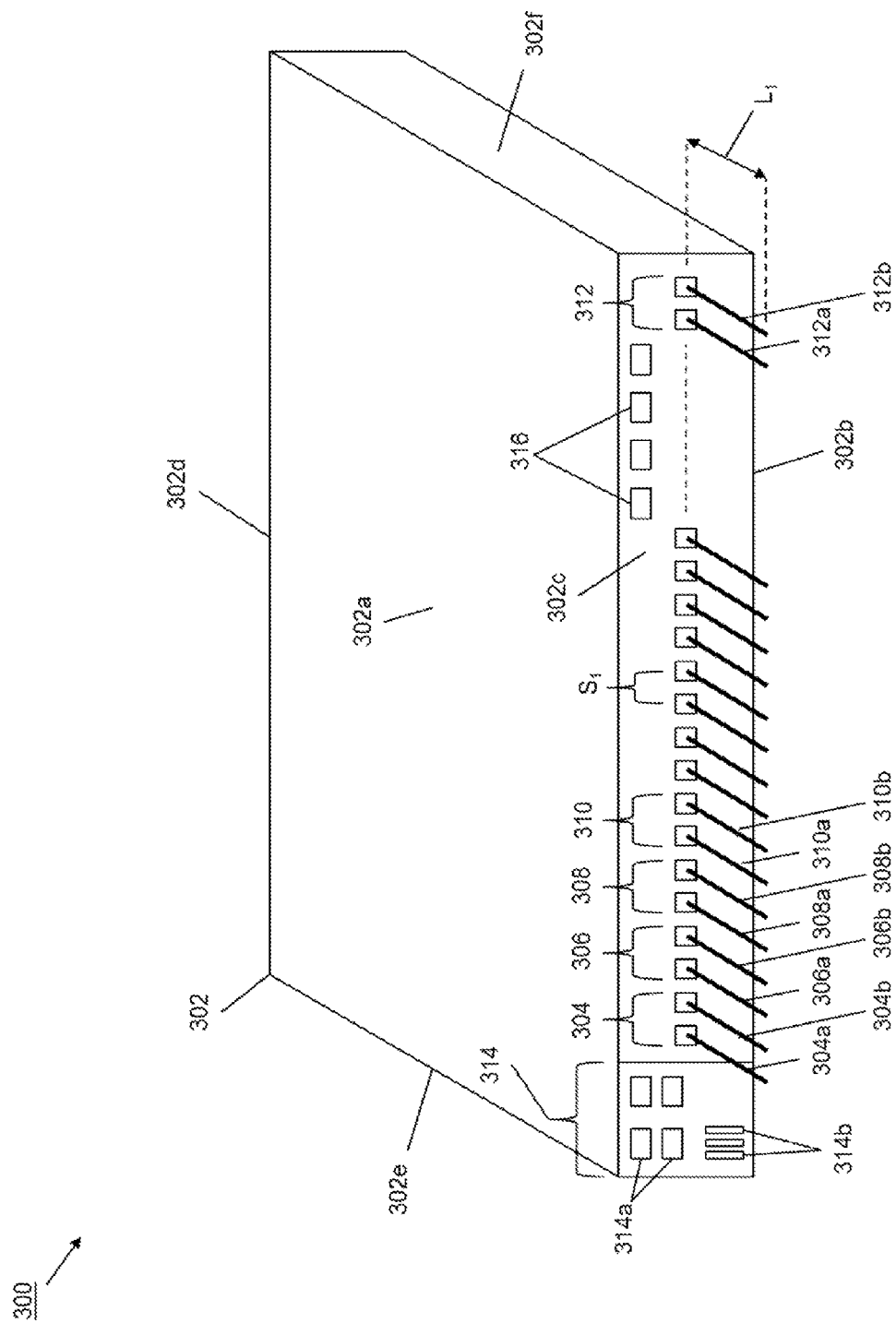
FIG. 3A is a perspective view illustrating an embodiment of a networking device.
Figure 3B:
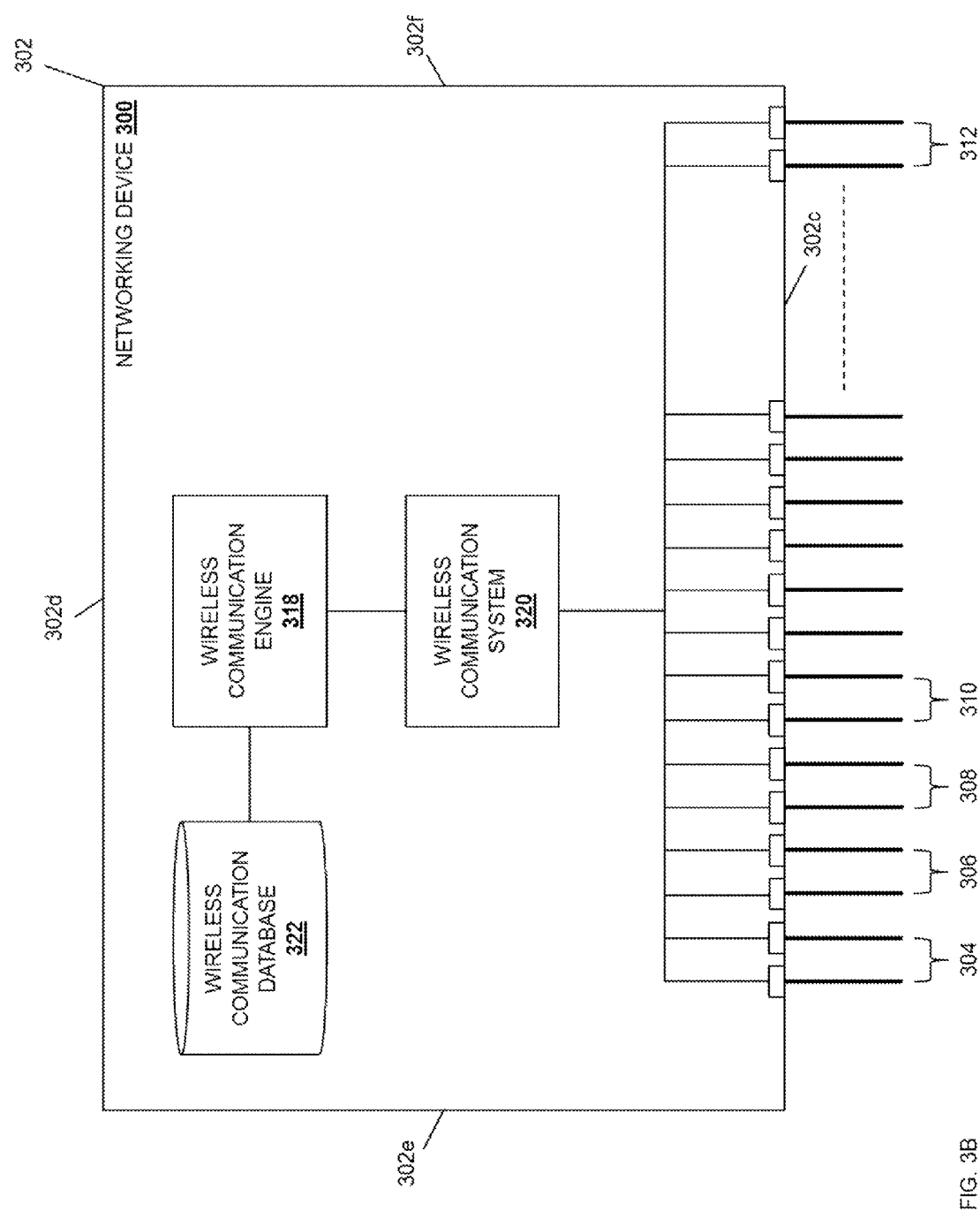

Referring now to FIGS. 3A and 3B, an embodiment of a networking device 300 is illustrated. The networking device 300 may be the IHS 100 discussed above with reference to FIG. 1 and/or may include some or all of the components of the IHS 100. In specific embodiments discussed below, the networking device 300 is illustrated and described as a Top Of Rack (TOR) switch. However, in other embodiments, the networking device 300 may be other types of switches (e.g., a Fibre Channel switch for a Storage Area Network (SAN)) and/or other types of rack devices while remaining within the scope of the present disclosure. The networking device 300 includes a chassis 302 having a top surface 302a, a bottom surface 302b that is located opposite the chassis 302 from the top surface 302a, a front surface 302c extending between the top surface 302a and the bottom surface 302b, a rear surface 302d located opposite the chassis 302 from the front surface 302c and extending between the top surface 302a and the bottom surface 302b, and a pair of side surfaces 302e and 302f located opposite the chassis 302 from each other and extending between the top surface 302a, the bottom surface 302b, the front surface 302c, and the rear surface 302d. While not illustrated, each of the side surfaces 302e and 302f (as well as other surfaces) on the networking device 300 may include rack engagement features for engaging the device coupling features 208 on the rack 200 to couple the networking device 300 to the rack 200.

In the embodiments discussed below, the front surface 302c of the networking device 300 provides a networking device antenna system surface, and a plurality of antenna systems 304, 306, 308, 310, and up to 312 extend from the networking device antenna system surface/front surface 302c (hereinafter, the "front surface 302c"). In the embodiments described below, the networking device 300 is provided in a rack that houses forty server devices, and forty antenna systems are provided on the front surface 302c of the networking device 300. However, different numbers of antenna systems may be provided based on different numbers of devices needing to communicate with the networking device 300 while remaining within the scope of the present disclosure. In the illustrated embodiment, each of the antenna systems 304-312 includes a pair of antennas (e.g., antennas 304a and 304b for antenna system 304, antennas 306a and 306b for antenna system 306, antennas 308a and 308b for antenna system 308, antennas 310a and 310b for antenna system 310, and antennas 312a and 312b for antenna system 312). However, different numbers of antennas (e.g., a single antenna, more than two antennas, etc.) will fall within the scope of the present disclosure. In experimental embodiments, the antennas in the antenna systems 304-312 were provided by 802.11ad transmitters and/or receivers (e.g., one of the antennas in each antenna system was provided as a transmitter, while the other antenna in that antenna system was provided as a receiver). While each of the antennas in the antenna systems 304-312 are illustrated with straight lines, one of skill in the art in possession of the present disclosure will recognize that the antenna(s) used in the antenna systems 304-312 may include a three-dimensional shape/configuration that provides a width and height (as well as the length that is illustrated and discussed below). For example, in experimental embodiments, the antennas used for the antenna systems 304-312 included a width of approximately 5 millimeters and a height of approximately 1-2 millimeters.

In the embodiments discussed below, each of the antennas in the antenna systems 304-312 is an integrated component of the networking device 300 such that it is not configured to be removed from the front surface 302c of the chassis 302. However, in some embodiments, the antennas for the antenna systems 304-312 may be configured to be coupled to and decoupled from the networking device 300. For example, the antennas for the antenna systems 304-312 may be configured to couple to Ethernet ports on the networking device 300 while remaining within the scope of the present disclosure. In some of those examples, the antennas for the antenna systems 304-312 may couple to conventional Ethernet ports on a structurally conventional networking device (that includes the wireless communication engines taught by the present disclosure) if the configuration of those Ethernet ports is sufficient to provide the wireless communication functionality discussed below. However, in other embodiments, the networking device 300 may be configured with Ethernet ports according to the teachings below (e.g., with the spacing and orientation discussed below for the antennas in the antenna systems 304-312) in order to provide the wireless communication functionality discussed below. Thus, one of skill in the art in possession of the present disclosure will recognize that the provisioning of antennas on the networking device 300 to provide the wireless communication functionality discussed below will depend on the configuration of the system (i.e., the rack, the devices in the rack, etc.), and a wide variety of different antenna systems (integrated, port-coupled, combinations thereof, etc.) will fall within the scope of the present disclosure.

Each antenna in the antenna systems 304-312 includes a length $L_1$ that may be measured from the front surface 302c of the networking device 300 to the distal end of that antenna that is opposite the front surface 302c. In the embodiments discussed below, that length $L_1$ is discussed as being approximately 3 inches. As discussed in further detail below, when the networking device 300 is full positioned in and coupled to a rack (e.g., the rack 200), a space typically exists between the front surface 302c of the networking device 300 and the rack entrance (e.g., the rack entrance 204) of the rack. That space typically ranges from between 3-5 inches, but can be smaller or larger depending on the particular networking devices and racks being used. In experimental embodiments, that space was approximately 3 inches, and the length $L_1$ of the antennas was selected to be approximately 3 inches to maximize the length of the antennas while not having the antennas extend past the rack entrance when the networking device 300 was positioned in the rack. As such, one of skill in the art in possession of the present disclosure will recognize that the length $L_1$ of the antennas in the antennas systems 304-312 may be adjusted based on the system constraints. In some examples, it may be desirable to maximize the length $L_1$ of the antennas while ensuring that they do not extend from the rack entrance as discussed above, while in other examples, the antennas may be allowed to extend past the rack entrance of the rack to further maximize their length $L_1$. As such, in conventional racks, the antennas in the antenna systems 304-312 may include a length $L_1$ of 3-5 inches, but that length may be extended (e.g., to extend out of the rack entrance or utilize additional space that may exists between the front surface 302c and the rack entrance) or reduced (e.g., when the space between the front surface 302c and the rack entrance is less than 3 inches) based on the configurations of the rack and other system parameters. In addition, while each of the antennas in the antenna systems 304-312 is illustrated as including the same length $L_1$, in some embodiments at least some of those antennas may include different lengths (e.g., based on the rack and other system limitations, obstructions, and/or other parameters discussed above).

Each of the antennas in the antenna systems 304-312 includes a spacing or pitch $S_1$, which is the distance between adjacent antennas. In experimental embodiments in which forty antenna systems were provided on the networking device 300 to communicate with forty servers in a rack, a spacing $S_1$ of approximately 5 millimeters between the antennas was provided between each antenna in the antenna systems 304-312. However, different spacing between antennas may be provided for different system configurations (e.g., a larger spacing for networking devices utilizing fewer antenna systems, to maximize the spacing between the antennas needed on the networking device 300 to communicate with the server devices 400 in the rack 200, discussed below) while falling within the scope of the present disclosure. Furthermore, while the spacing $S_1$ between each antenna is illustrated below as the same, different spacing (e.g., a first spacing between antennas in the same antennas system that is smaller than a second spacing between adjacent antenna in different antenna systems) will fall within the scope of the present disclosure as well. While the antennas in the antenna systems 304-312 are illustrated and described as substantially centrally located on the front surface 302c (e.g., midway between the top surface 302a and the bottom surface 302b and each along a common horizontal line with respect to the front surface 302cv), different locations of the antennas in the antenna systems 304-312 relative to the front surface 302c are envisioned as falling within the scope of the present disclosure. In the experimental embodiments discussed below, the antennas on the antenna systems 304-312 were provided on the front surface 302c a distance of 1.5 inches below the top surface 302a.

The networking device 300 may also include a variety of other networking device features, only some of which are illustrated in FIGS. 3A and 3B. For example, a management port area 314 may be provided on the front surface 302c. In the illustrated embodiment, the management port area 314 includes a plurality of management Ethernet ports 314a and a plurality of management Universal Serial Bus (USB) ports 314b, but one of skill in the art in possession of the present disclosure will recognize that a variety of other management ports and/or management features may be provided in the management port area 314 while remaining within the scope of the present disclosure. Furthermore, the management port area 314 is provided at a location on the front surface 302c of the networking device 300 that is adjacent the side surface 302e based, at least on part, in the configuration of the rack 200 in order to provide the unobstructed wireless communication paths discussed below, and the location of the management port area 314 may be moved based on different rack configurations to provide different unobstructed wireless communication paths as desired or required by the rack configuration. In experimental embodiments, a management port area 314 was provided that utilized 2.5 inches of the front surface 302c that was immediately adjacent the side surface 302e.

In addition, a plurality of networking ports 316 (e.g., Ethernet ports, switch uplink ports, etc.) may be provided on the front surface 302c of the networking device 300 between the antenna systems 304-312 and the top surface 302a. Similarly as with the management port area 314, the networking ports 316 are provided at their illustrated location on the front surface 302c of the networking device 300 based, at least on part, in the configuration of the rack 200 in order to provide the unobstructed wireless communication paths discussed below, and the location of the networking ports 316 may be moved based on different rack configurations to provide different unobstructed wireless communication paths as desired or required by the rack configuration. In the specific embodiment illustrated in FIG. 3A, no ports or other obstructions are provided on the front surface 302c between the antenna systems 304-312 and the bottom surface 302b of the chassis 302 in order to provide the unobstructed wireless communication paths discussed below. However, one of skill in the art in possession of the present disclosure will recognize how the networking device 300 may be modified to operate as discussed below when used with the rack in different configurations (e.g., by providing an unobstructed front surface 302c between the antenna systems 304-312 and the top surface 302a when the networking device 300 is positioned in the bottom of a rack).

Referring now to FIG. 3B, the chassis 302 of the networking device 300 may house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a wireless communication engine 318 that is configured to perform the functions of the wireless communication engines and networking devices discussed below. The wireless communication engine 318 is coupled to a wireless communication system 320 (e.g., via a coupling between the processing system and the wireless communication system 320) that is coupled to each of the antenna systems 304-312. In different embodiments, the wireless communication system 320 may be any of a variety of wireless communication systems known in the art. For example, as discussed below, the wireless communication system 320 may be configured to provide wireless communications over line-of-sight wireless communication paths via each of the antenna systems 304-312. In an experimental embodiment, the wireless communication system 320 was provided as per the Institute of Electrical and Electronics Engineers (IEEE) 802.11ad specification. However, one of skill in the art in possession of the present disclosure will recognize that other wireless communication techniques will fall within the scope of the present disclosure. The wireless communication engine 318 is also coupled to a storage device (not illustrated, but which may be the storage device 108, discussed above with reference to FIG. 1, that is coupled to the processing system) that includes a wireless communication database 322.

Figure 4A:
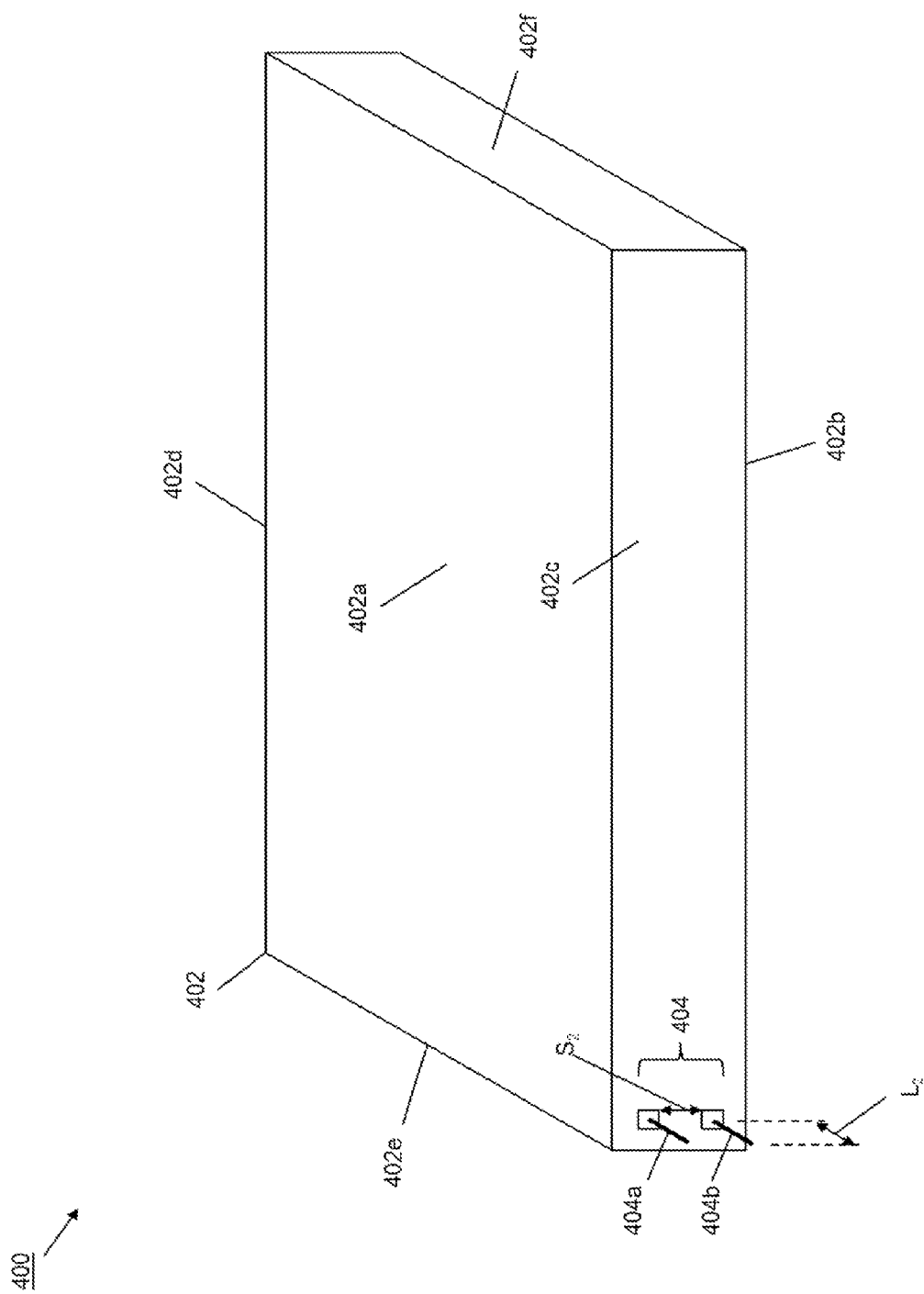
FIG. 4A is a perspective view illustrating an embodiment of a server device.
Figure 4B:
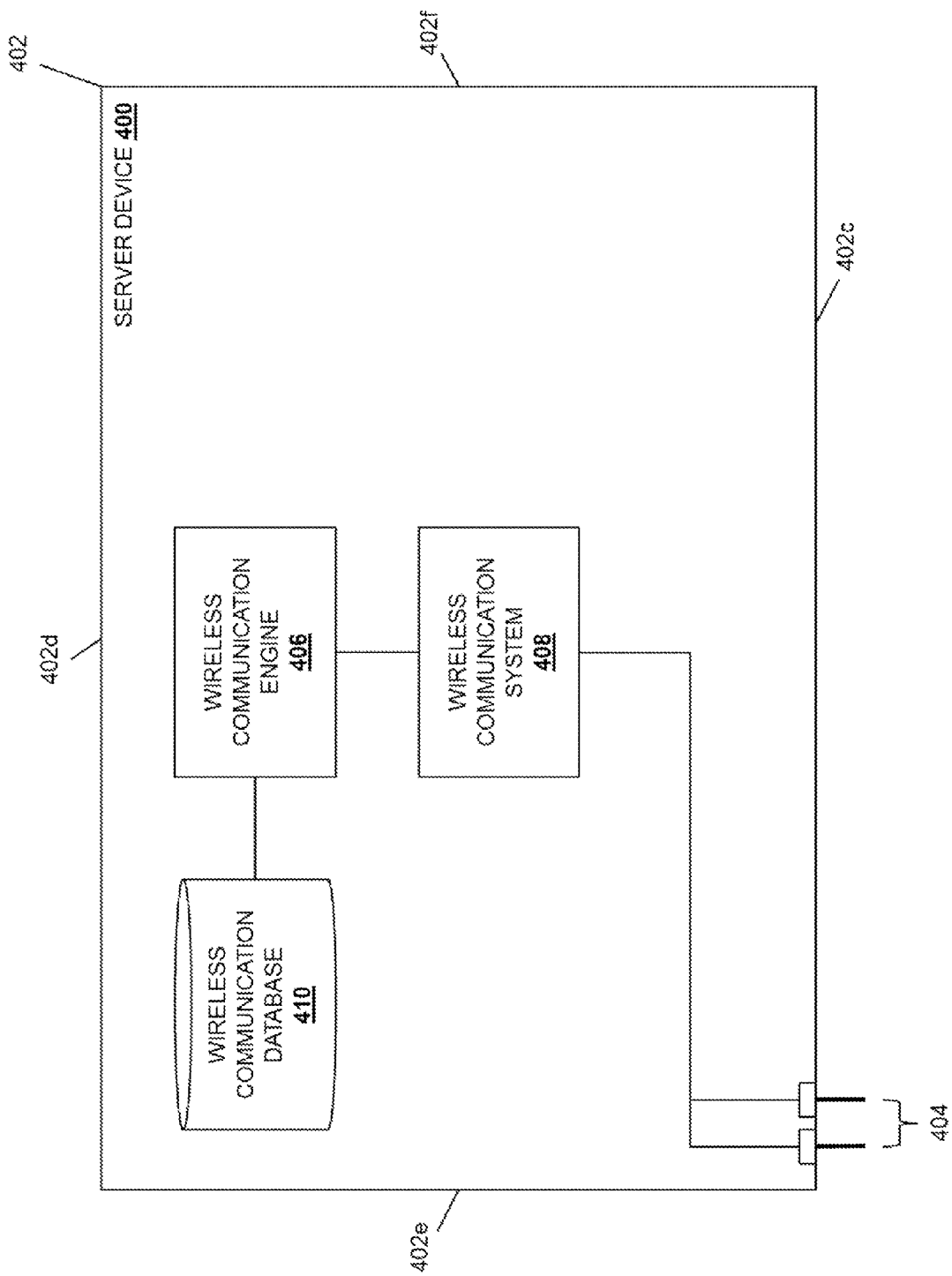
FIG. 4B is a schematic view illustrating an embodiment of the server device of FIG. 4a FIG. 5 is a flow chart illustrating a method for providing wireless communications in a rack.

Referring now to FIGS. 4A and 4B, an embodiment of a server device 400 is illustrated. The server device 400 may be the IHS 100 discussed above with reference to FIG. 1 and/or may include some or all of the components of the IHS 100. In specific embodiments discussed below, the server device 400 is illustrated and described as a data center server. However, in other embodiments the server device 400 may be provided instead by storage devices in a Storage Area Network (SAN)) and/or other types of rack devices while remaining within the scope of the present disclosure. The server device 400 includes a chassis 402 having a top surface 402a, a bottom surface 402b that is located opposite the chassis 402 from the top surface 402a, a front surface 402c extending between the top surface 402a and the bottom surface 402b, a rear surface 402d located opposite the chassis 402 from the front surface 402c and extending between the top surface 402a and the bottom surface 402b, and a pair of side surfaces 402e and 402f located opposite the chassis 402 from each other and extending between the top surface 402a, the bottom surface 402b, the front surface 402c, and the rear surface 402d. While not illustrated, each of the side surfaces 402e and 402f (as well as other surfaces) on the server device 400 may include rack coupling features for engaging the device coupling features 208 on the rack 200 to couple the server device 400 to the rack 200.

In the embodiments discussed below, the front surface 402c of the server device 400 provides a server device antenna system surface, and an antenna system 404 extends from the networking device antenna system surface/front surface 402c (hereinafter, the "front surface 402c) at a location that is adjacent the side surface 402e. In the illustrated embodiment, the antenna system 404 includes a pair of antennas (e.g., antennas 404a and 404b). However, different numbers of antennas (e.g., a single antenna, more than two antennas, etc.) will fall within the scope of the present disclosure. In experimental embodiments, the antennas in the antenna system 404 were provided by 802.11ad transmitters and/or receivers (e.g., one of the antennas in the antenna system was provided as a transmitter, while the other antenna in that antenna system was provided as a receiver). While the antennas in the antenna system 404 are illustrated with straight lines, one of skill in the art in possession of the present disclosure will recognize that the antenna(s) used in the antenna system 404 may include a three-dimensional shape/configuration that provides a width and height (as well as the length that is illustrated and discussed below). For example, in experimental embodiments, the antennas used for the antenna system 404 included a width of approximately 5 millimeters and a height of approximately 1-2 millimeters. In some embodiments, it may be desirable to minimize the width of antennas to ensure that no interference is introduced between adjacent antennas.

In the embodiments discussed below, the antennas for the antenna system 404 are configured to be coupled to and decoupled from the server device 400. For example, the antennas 404a and 404b for the antenna system 404 may be the 802.11ad transmitters/receivers that are configured to couple to dual-Ethernet ports on the server device 400. In experimental embodiments, the antennas 404a and 404b for the antenna system 404 were coupled to conventional dual Ethernet ports on a structurally conventional server device (that includes the wireless communication engines taught by the present disclosure) to provide the wireless communication functionality discussed below. However, in other embodiments, the server device 400 may be configured with Ethernet ports according to the teachings below (e.g., with the spacing and orientation discussed below for the antennas in the antenna system 404) in order to provide the wireless communication functionality discussed below. Furthermore, in other embodiments, each of the antennas 404a and 404b in the antenna system 404 may be an integrated component of the server device 400 such that it is not configured to be removed from the front surface 402c of the chassis 402. Thus, one of skill in the art in possession of the present disclosure will recognize that the provisioning of antennas 404a and 404b on the server device 400 to provide the wireless communication functionality discussed below will depend on the configuration of the system (i.e., the rack, the devices in the rack, etc.), and a wide variety of different antenna systems (integrated, port-coupled, combinations thereof, etc.) will fall within the scope of the present disclosure.

Each antenna 404a and 404b in the antenna system 404 includes a length $L_2$ that is measured from the front surface 402c of the server device 400 to the distal end of that antenna that is opposite the antenna from the front surface 402c. In the embodiments discussed below, that length $L_2$ is discussed as being approximately 1 inch. As discussed in further detail below, when the server device 400 is full positioned in and coupled to a rack (e.g., the rack 200), a space typically exists between the front surface 402c of the server device 400 and the rack entrance (e.g., the rack entrance 204) of the rack. That space typically ranges from between 3-5 inches, but can be smaller or larger than that for particular networking devices and racks. In experimental embodiments, that space was approximately 3 inches, and the length of the antennas was selected to be approximately 1 inch to provide the wireless communication functionality discussed below. However, one of skill in the art in possession of the present disclosure will recognize that the length $L_2$ of the antennas in the antenna system 404 may be adjusted based on the system. In addition, while each of the antennas 404a and 404b in the antenna system 404 is illustrated as including the same length $L_2$, in some embodiments at least some of those antennas may include different lengths (e.g., based on the rack and other system limitations, obstructions, and/or other parameters discussed above).

The antennas in the antenna system 404 include a spacing or pitch $S_2$ between the antennas 404a and 404b. In experimental embodiments in which the server device 400 included a 1 rack unit (RU) height, a spacing $S_2$ of approximately ½ a rack unit between the antennas 404a and 404b was provided (e.g., based on a 0.5 inch spacing between dual-Ethernet ports on the server device 400), with the antenna 404a ¼ RU from the top surface 402a and the antenna 404b ¼ RU from the bottom surface 402b. However, different spacing between antennas and the top/bottom surfaces of the server device 400 may be provided for different system configurations while falling within the scope of the present disclosure. While the antennas 404a and 404b in the antenna system 404 are illustrated and described as vertically aligned and located on the front surface 302c adjacent the side surface 402e, different orientations and locations of the antennas 404a and 404b in the antenna system 404 relative to the front surface 402c are envisioned as falling within the scope of the present disclosure. In the experimental embodiments discussed below, the antennas 404a and 404b on the antenna system 404 were provided on the front surface 402c a distance of at least 1 inch from the side surface 402e.

Referring now to FIG. 4B, the chassis 402 of the server device 400 may house a processing system (not illustrated, but which may be the processor 102 discussed above with reference to FIG. 1) and a memory system (not illustrated, but which may be the system memory 114 discussed above with reference to FIG. 1) that includes instructions that, when executed by the processing system, cause the processing system to provide a wireless communication engine 406 that is configured to perform the functions of the wireless communication engines and server devices discussed below. The wireless communication engine 406 is coupled to a wireless communication system 408 (e.g., via a coupling between the processing system and the wireless communication system 408) that is coupled to the antenna system 404. In different embodiments, the wireless communication system 408 may be any of a variety of wireless communication systems known in the art. For example, as discussed below, the wireless communication system 408 may be configured to provide wireless communications over line-of-sight wireless communication paths via each of the antenna system 404. In an experimental embodiment, the wireless communication system 404 was provided as per the IEEE 802.11ad specification. However, one of skill in the art in possession of the present disclosure will recognize that other wireless communication techniques will fall within the scope of the present disclosure. The wireless communication engine 408 is also coupled to a storage device (not illustrated, but which may be the storage device 108, discussed above with reference to FIG. 1, that is coupled to the processing system) that includes a wireless communication database 410.

Figure 5:
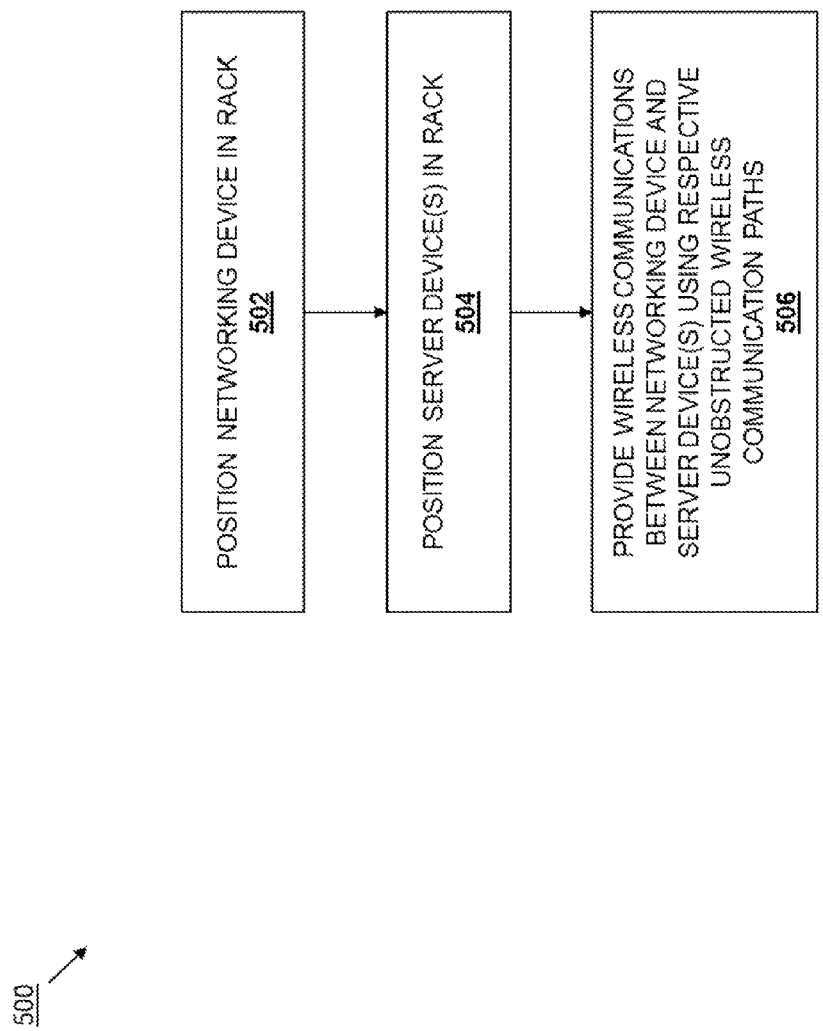

Referring now to FIG. 5, an embodiment of a method 500 for providing wireless rack communications is illustrated. As discussed in further detail below, embodiments of the rack 200, networking device 300, and server devices 400 may be utilized to provide a wireless rack communication systems that includes a three-dimensional, unobstructed line-of-sight wireless communication volume having an unobstructed, line-of-sight wireless communication path between the antenna system on each server device 400 and a respective one of the antenna systems on the networking device 300. As such, wireless communication systems such as, for example, high frequency wireless communication systems that operate according to the IEEE 802.11ad specification at carrier frequencies around 60 GHz and higher may be utilized to transmit data between the networking device 300 and each server devices 400 in the rack 200 along the unobstructed, line-of-sight wireless communication path between their respective antenna systems without losses due to obstructions, signal reflections, signal distortions, and/or other wireless communication interface that can result in signal losses or otherwise degrade those wireless communications. Many high speed direct wireless communication systems require line of sight paths between the sender and the receiver, as well as a minimum distance between adjacent paths or channels, in order to ensure proper wireless communications, and the systems and methods of the present disclosure provide such paths to ensure high speed, reliable communications between the networking device 300 and the server devices 400.

Figure 6A:
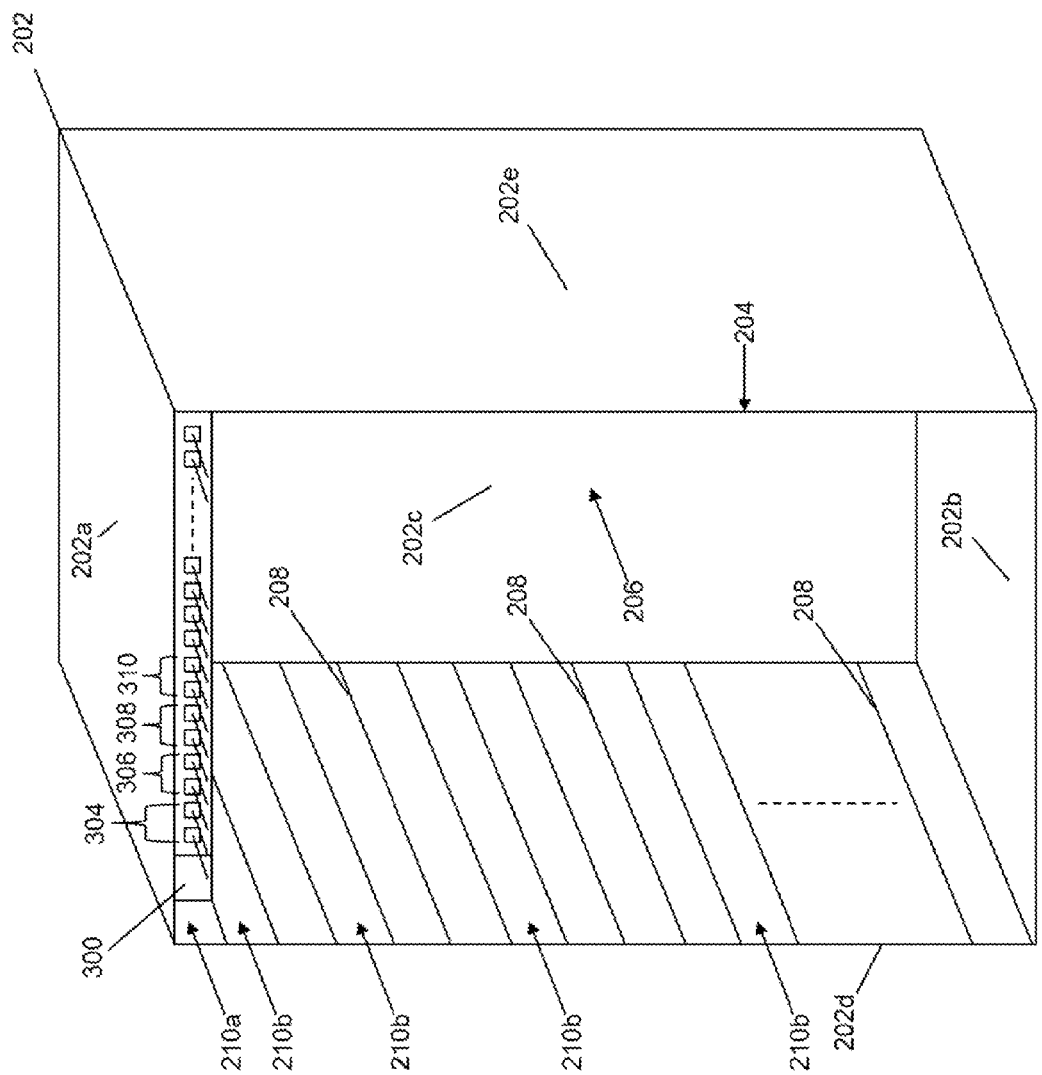
FIG. 6A is a perspective view illustrating an embodiment of the networking device of FIGS. 3a and 3b positioned in the rack of FIG. 2.
Figure 6B:
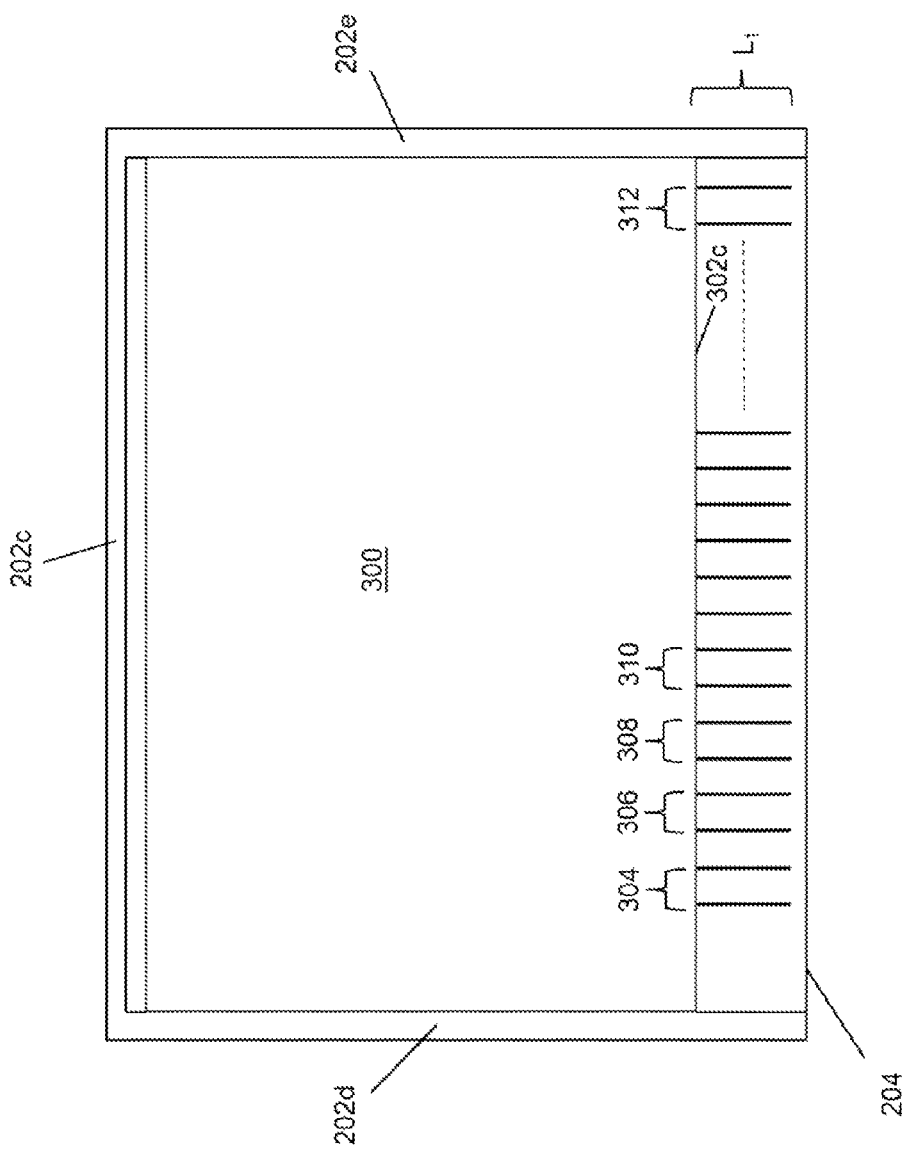
FIG. 6B is a top, cut-away view illustrating an embodiment of the networking device of FIGS. 3a and 3b positioned in the rack of FIG. 2.

The method 500 begins at block 502 where a networking device is positioned in a rack. Referring now to FIGS. 6A and 6B, in an embodiment of block 502, the rack 200 illustrated in FIG. 2 is provided, and the networking device 300 illustrated in FIGS. 3A and 3B is positioned in the first device housing 210a defined by the rack base 202. For example, the networking device 300 may be positioned adjacent the first device housing 210a on the rack 200 such that the rear surface 302d of the chassis 302 for the networking device 300 is aligned with the first device housing 210a, and then the networking device 300 is moved towards the rack 200 such that the chassis 302 of the networking device 300 enters the first device housing 210a and the rack coupling features on the side surfaces 302e and 302f of the chassis 302 engage the device coupling features 208 on the side walls 202d and 202e of the rack 200. The networking device 300 may then be moved through the first device housing 210a until the networking device 300 is fully positioned in the rack 200. FIGS. 6A and 6B illustrate an embodiment of the networking device 300 fully positioned in the first device housing 210a. In that embodiment, the front surface 302c of the networking device 300 is spaced apart from the rack entrance 204 of the rack 200. As discussed above, the spacing between the front surface 302c of the networking device 300 and the rack entrance 204 of the rack 200 is typically around 3-5 inches, and in experimental embodiments, was approximately 3 inches. As also can be seen in FIG. 6B, the length $L_1$ of antennas in the antenna systems 304-312 is such that those antenna extend from the front surface 302c of the networking device 300 and into the first device housing 210a, but not past the rack entrance 204 defined by the rack 200. However, as discussed above, in some embodiments the extension of the antennas in the antenna systems 304-312 past the rack entrance 204 may be allowable and thus will fall within the scope of the present disclosure.

Figure 6C:
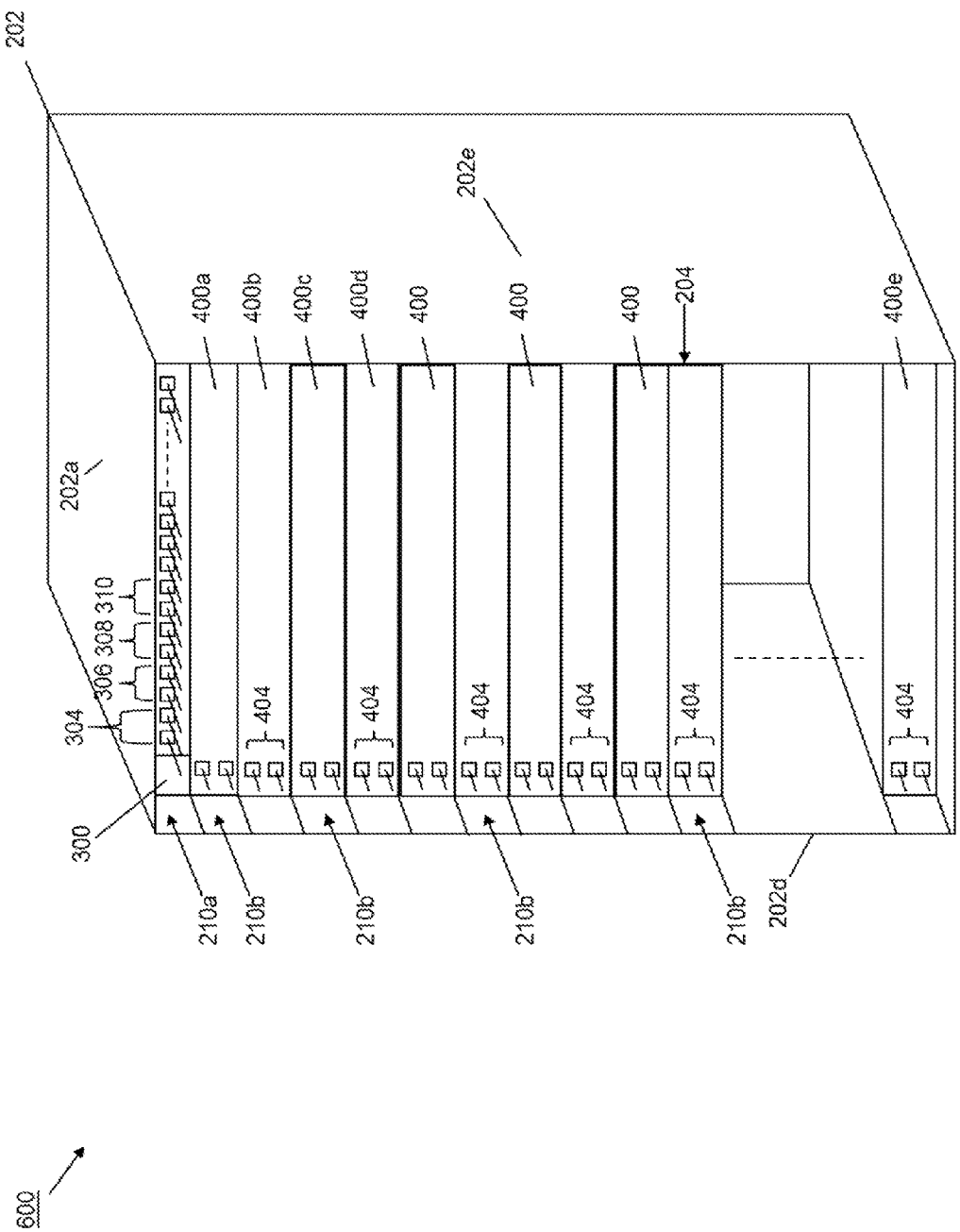
FIG. 6C is a perspective view illustrating an embodiment of a plurality of the server devices of FIGS. 4a and 4b positioned in the rack of FIG. 2.
Figure 6D:
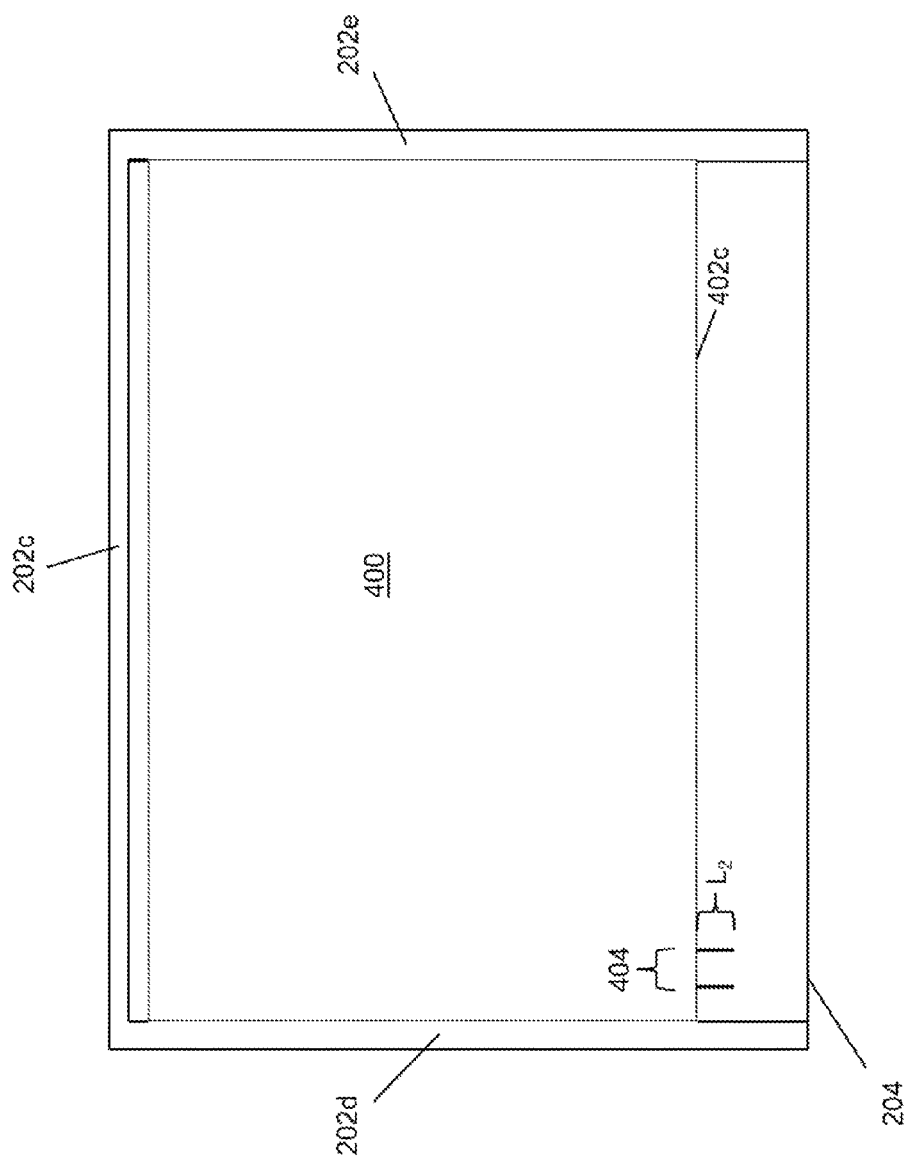
FIG. 6D is a top, cut-away view illustrating an embodiment of the server device of FIGS. 4a and 4b positioned in the rack of FIG. 2.

The method 500 then proceeds to block 504 where server device(s) are positioned in the rack. Referring now to FIGS. 6C and 6D, in an embodiment of block 504, one of the server devices 400 illustrated in FIGS. 4A and 4B may be positioned in any or all of the second device housings 210b defined by the rack base 202. For example, a server device 400 may be positioned adjacent one of the second device housings 210b on the rack 200 such that the rear surface 402d of the chassis 402 for the server device 400 is aligned with that second device housing 210b, and then the server device 400 is moved towards the rack 200 such that the chassis 402 of the server device 400 enters that second device housing 210b and the rack coupling features on the side surfaces 402e and 402f of the chassis 402 engage the device coupling features 208 on the side walls 202d and 202e of the rack 200. The server device 400 may then be moved through the second device housing 210b until the server device 400 is fully positioned in the rack 200.

FIGS. 6c and 6d illustrate an embodiment of a wireless rack communication system 600 with the networking device 300 fully positioned in the first device housing 210a and a plurality of the server devices 400 fully positioned in each of the second device housing 210b. For example, a server device 400a, a server device 400b, a server device 400c, a server device 400d, and up to a server device 400e (as well as other server devices 400) are illustrated fully positioned in the second device housings 210b. In that embodiment, the front surfaces 402c of the server devices 400 are spaced apart from the rack entrance 204 of the rack 200. As discussed above, the spacing between the front surfaces 402c of the server devices 400 and the rack entrance 204 of the rack 200 is typically around 3-5 inches, and in experimental embodiments, was approximately 3 inches. As also can be seen in FIG. 6D, the length $L_2$ of antennas in the antenna system 404 is such that those antenna extend from the front surface 402c of the server devices 400 and into the second device housings 210b, but not past the rack entrance 204 defined by the rack 200. However, as discussed above, in some embodiments the extension of the antennas in the antenna system 404 past the rack entrance 204 may be allowable and thus will fall within the scope of the present disclosure.

The method 500 then proceeds to block 506 where wireless communications are provided between the networking device and the server device(s) using respective unobstructed wireless communication paths. In an embodiment of block 506, the networking device 300 may be powered on, reset, booted up, and/or otherwise initiated. In a specific example, the server device 400e may then also be powered on, reset, booted up, and/or otherwise initiated. In response to being initiated, the wireless communication engine 406 in the server device 400e may operate to "pair" or otherwise establish a connection with the wireless communication engine 318 in the networking device 300. While the details of establishing such a connection between the server devices 400 and the networking device 300 of the present disclosure will be described in a subsequently filed patent application, it should be sufficient to say in the present disclosure that the wireless communication engine 406 in the server device 400e may utilize information in the wireless communication database 410 to determine that communication should be established with the antenna system 312 on the networking device 300 (e.g., based on a detected or determined position of the server device 400e in the rack 200), and then utilize that and/or other information in the wireless communication database 410 along with the wireless communication system 408 to begin establishing the connection with the networking device 300 via that antenna system 312. The wireless communication engine 318 in the networking device 400 may then receive that information through the antenna system 312 using the wireless communication system 320, and utilize that information and/or other information in the wireless communication database 322 to confirm the connection with the server device 400e and provide the unobstructed wireless communication path between the antenna system 312 on the networking device 300 and the antenna system 404 on the server device 400. The establishment of the connection between the other server devices 400 and the networking device 300 may be performed in substantially similar manners.

Referring now to FIG. 6E, an embodiment of a plurality of unobstructed wireless communication paths are illustrated between antennas in the antenna systems 404 on the server devices 400 and the antennas in the antenna systems 304-312 on the networking device 300. For example, a first unobstructed line-of-sight wireless communication path 602a (illustrated by a dashed, arrowed line in FIG. 6E) is provided between the antenna 404a of the antenna system 404 on the server device 400e and the antenna 312a on the antenna system 312 of the networking device 300, while a second unobstructed line-of-sight wireless communication path 602b (illustrated by a dashed, arrowed line in FIG. 6E) is provided between the antenna 404b of the antenna system 404 on the server device 400e and the antenna 312b on the antenna system 312 of the networking device 300. While not provided reference numbers in order to maintain clarity in FIG. 6E, similar unobstructed line-of-sight wireless communication paths are illustrated as provided between the antenna system 404 on the server device 400a and the antenna system 304 on the networking device 300, between the antenna system 404 on the server device 400b and the antenna system 306 on the networking device 300, between the antenna system 404 on the server device 400c and the antenna system 308 on the networking device 300, between the antenna system 404 on the server device 400d and the antenna system 310 on the networking device 300, as well as between the antenna systems on the other server devices 400 in the rack 200 and respective antenna systems on the networking device 300. In experimental embodiments, the wireless rack communication system 600 was configured such that no points on any two unobstructed, line of sight, wireless communication paths between any of the antenna systems on forty server devices in the rack 200 and the antenna systems on the networking device 300 were within 5 millimeters of each other (satisfying the minimum distance necessary for adjacent paths or channels for 802.11ad wireless transmissions).

As discussed above, the antennas on the antenna systems 404 on the server devices 400, the antennas on the antenna systems 304-312 on networking device 400, and the rack 200 are each configured such that no obstructions are present anywhere between the antennas in the antenna systems 404 and the antennas in the antenna systems 304-312, thus enabling each of the unobstructed, line of sight, wireless communication paths illustrated in FIG. 6E. With those unobstructed, line of sight, wireless communication paths enabled, each of the server devices 400 in the rack 200 may communicate with the networking device 400 wirelessly (e.g., utilizing a 60 GHz carrier frequency according to the IEEE 802.11ad specification) without signal distortion, degradation, or other losses that might result if obstructions were present between the antenna systems 404 and 302-312. Furthermore, in the specific embodiments illustrated in FIGS. 6B and 6D, each of the unobstructed, line of sight, wireless communication paths may be provided within the rack housing 206 defined by the rack 200 and between the front surfaces of the networking device 300/server devices 400 and the rack entrance 204. While a specific embodiment is illustrated with the networking device 300 positioned at the "top" of the rack 200 and each of the server devices 400 positioned below the networking device 300, one of skill in the art will recognize that a variety of different configurations of the networking device 300 and the server devices 400 in the rack 200 will enable the unobstructed, line of sight, wireless communication paths while remaining within the scope of the present disclosure. Furthermore, while 1-to-1 networking antenna system/server antenna system communication paths have been illustrated and described, in some embodiments, multiple antenna systems may communicate with a single antenna system. For example, the antenna system 404 on a server device 400 may communicate (via multiple unobstructed wireless communications paths) with the antenna systems 304 and 306 (and others if desired) on the networking device 300 while remaining within the scope of the present disclosure.

Thus, systems and methods have been described that provide a rack that houses a networking device and a plurality of server devices while providing a three dimensional, unobstructed line of sight volume within which antenna systems may be extended from each of the networking device and the server devices in order to establish unobstructed wireless communication paths that allow each of the server devices to wirelessly communicate with the networking device without the signal distortion, degradation, or losses associated with conventional wireless communication techniques. Such systems and methods eliminate the need for conventional cabling between the networking device and server devices in a rack, while ensuring high speed, reliable communications and data transfer that is necessary for the functioning of data centers.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A wireless rack communication system, comprising:
a rack that defines a rack entrance and a plurality of device housings that are accessible through the rack entrance;
a networking device that is positioned in a first device housing of the plurality of device housings in the rack, wherein the networking device includes a networking device antenna system surface that is spaced apart from the rack entrance, and a plurality of networking device antenna systems that each extend from the networking device antenna system surface and into the first device housing; and
a plurality of server devices that are each positioned in respective second device housings of the plurality of device housings in the rack that are located adjacent each other and on a same side of the first device housing, wherein each of the plurality of server devices include a server device antenna system surface that is spaced apart from the rack entrance and a server device antenna system that extends from that server device antenna system surface and into the respective second device housing for that server device;
wherein an unobstructed wireless communication path is provided between each of the server device antenna systems and a respective one of the networking device antenna systems, and wherein each unobstructed wireless communication path is provided along a respective line-of-sight that is not crossed by the line-of-sight along which any of the other unobstructed wireless communication paths are provided.

2. The wireless rack communication system of claim 1, wherein each of the plurality of networking device antenna systems includes a plurality of antennas, and wherein each of the server device antenna systems includes a plurality of antennas.

3. The wireless rack communication system of claim 1, wherein each unobstructed wireless communication path is a line-of-sight communication path.

4. The wireless rack communication system of claim 1, wherein each line of sight communication path is separated from immediately adjacent line of sight communication paths by at least 5 millimeters.

5. The wireless rack communication system of claim 1, wherein each of the plurality of networking device antenna systems includes at least one networking device antenna, and wherein each of the server device antenna systems includes at least one server device antenna that includes a length that is no greater than half the length of the at least one networking device antenna.

6. The wireless rack communication system of claim 1, wherein each of the plurality of networking device antenna systems and each of the server device antenna systems do not extend past the rack entrance.

7. An information handling system (IHS), comprising:
a chassis that is configured to couple to a rack and that includes an antenna system surface that is spaced apart from a rack entrance defined by the rack when the chassis is coupled to the rack;
a wireless communication system that is housed in the chassis;
a processing system that is housed in the chassis and coupled to the wireless communication system; and
a plurality of first antenna systems that each extend from the antenna system surface and into a device housing between the antenna system surface and the rack entrance when the chassis is coupled to the rack, wherein the wireless communication system is configured to provide wireless communications through each of the plurality of first antenna systems using an unobstructed wireless communication path between that first antenna system and a respective one of a plurality of second antenna systems provided on respective devices that are each positioned in the rack on the same side of the chassis when the chassis is coupled to the rack, and wherein each unobstructed wireless communication path is provided along a respective line-of-sight that is not crossed by the line-of-sight along which any of the other unobstructed wireless communication paths are provided.

8. The IHS of claim 7, wherein each of the plurality of first antenna systems includes a plurality of antennas.

9. The IHS of claim 7, wherein each unobstructed wireless communication path is a line-of-sight communication path.

10. The IHS of claim 9, wherein each line of sight communication path is separated from immediately adjacent line of sight communication paths by at least 5 millimeters.

11. The IHS of claim 7, wherein each of the plurality of first antenna systems includes at least one antenna, and wherein each of the plurality of second antenna systems includes at least one second antenna that includes a length that is no greater than half the length of the at least one first antenna.

12. The IHS of claim 7, wherein each of the plurality of first antenna systems do not extend past the rack entrance when the chassis is positioned in the rack.

13. The IHS of claim 7, wherein at least one of the plurality of first antenna systems is connected to at least one Ethernet port that is coupled to the wireless communication system.

14. A method for providing wireless rack communications, comprising:
positioning a networking device in a first device housing that is defined by a rack that includes a rack entrance, wherein the networking device includes a networking device antenna system surface that is spaced apart from the rack entrance and a plurality of networking device antenna systems that each extend from the networking device antenna system surface and into the first device housing; and
positioning a plurality of server devices in respective second device housings that are defined by the rack and located adjacent each other and on a same side of the first device housing, wherein each of the plurality of server devices include a server device antenna system surface that is spaced apart from the rack entrance and a server device antenna system that extends from that server device antenna system surface and into the respective second device housing for that server device; and
wirelessly communicating using an unobstructed wireless communication path that is provided between each of the server device antenna systems and a respective one of the networking device antenna systems, wherein each unobstructed wireless communication path is provided along a respective line-of-sight that is not crossed by the line-of-sight along which any of the other unobstructed wireless communication paths are provided.

15. The method of claim 14, wherein each of the plurality of networking device antenna systems includes a plurality of antennas, and wherein each of the server device antenna systems includes a plurality of antennas.

16. The method of claim 14, wherein each unobstructed wireless communication path is a line-of-sight communication path.

17. The method of claim 16, wherein each line of sight communication path is separated from immediately adjacent line of sight communication paths by at least 5 millimeters.

18. The method of claim 14, wherein each of the plurality of networking device antenna systems includes at least one networking device antenna, and wherein each of the server device antenna systems includes at least one server device antenna that includes a length that is no greater than half the length of the at least one networking device antenna.

19. The method of claim 14, wherein each of the plurality of networking device antenna systems and each of the server device antenna systems do not extend past the rack entrance.

20. The method of claim 14, further comprising:
connecting at least one of the plurality of first antenna systems to at least one Ethernet port on the networking device.

* * * * *